United States Patent
Bagheri

(10) Patent No.: US 9,933,268 B2
(45) Date of Patent: Apr. 3, 2018

(54) METHOD AND SYSTEM FOR IMPROVING ACCURACY OF DIGITAL MAP DATA UTILIZED BY A VEHICLE

(71) Applicant: VOLVO CAR CORPORATION, Gothenburg (SE)

(72) Inventor: Toktam Bagheri, Hovas (SE)

(73) Assignee: Volvo Car Corporation, Gothenburg (SE)

(*) Notice: Subject to any disclaimer, the term of this patent is extended or adjusted under 35 U.S.C. 154(b) by 0 days.

(21) Appl. No.: 14/956,927

(22) Filed: Dec. 2, 2015

(65) Prior Publication Data
US 2016/0161265 A1  Jun. 9, 2016

(30) Foreign Application Priority Data
Dec. 9, 2014  (EP) .................... 14196915

(51) Int. Cl.
*G01C 21/32* (2006.01)
(52) U.S. Cl.
CPC .................. *G01C 21/32* (2013.01)
(58) Field of Classification Search
CPC ............ G01C 21/32; G06F 17/30241
See application file for complete search history.

(56) References Cited

U.S. PATENT DOCUMENTS

| | | | |
|---|---|---|---|
| 7,868,821 B2 * | 1/2011 | Hoshizaki | G01S 19/45 342/357.42 |
| 8,467,810 B2 * | 6/2013 | Kaplan | G01C 21/32 455/404.1 |
| 8,717,387 B1 * | 5/2014 | Brewington | G06T 3/0075 345/619 |
| 8,862,384 B2 * | 10/2014 | Stahlin | G01C 21/28 701/400 |
| 8,942,920 B1 * | 1/2015 | Davidson | G01C 21/32 701/446 |
| 9,342,888 B2 * | 5/2016 | Menashe | G06T 7/0044 |

(Continued)

OTHER PUBLICATIONS

Johnson et al., "A General Approach to Terrain Relative Navigation for Planetary Landing", AIAA Aerospace@Infotech Conf., May 2007, pp. 1-9.*

(Continued)

*Primary Examiner* — Todd Melton
(74) *Attorney, Agent, or Firm* — Brooks Kushman P.C.

(57) ABSTRACT

A digital map enhancement system and a method performed by the system are disclosed for improving accuracy of pre-stored digital map data of a digital map to be utilized by a vehicle. The system determines a current position of the vehicle, and identifies, in the pre-stored digital map data, a mapped digital landmark representing a stationary landmark predicted to be in the vicinity of the current position of the vehicle, which mapped digital landmark includes a pre-stored position of the stationary landmark. The system detects the stationary landmark by one or more sensor devices on-board the vehicle, which are adapted for observing the surroundings of the vehicle, and determines a detected position of the stationary landmark based on the current position of the vehicle and the detection of the stationary landmark. The system updates the pre-stored position of the mapped digital landmark with the detected position of the stationary landmark.

13 Claims, 4 Drawing Sheets

(56) References Cited

U.S. PATENT DOCUMENTS

| | | | |
|---|---|---|---|
| 9,423,260 B2* | 8/2016 | Stahlin | G01C 21/26 |
| 9,429,438 B2* | 8/2016 | Weng | |
| 9,435,653 B2* | 9/2016 | Zeng | B60W 30/0956 |
| 2008/0056535 A1* | 3/2008 | Bergmann | G01C 21/30 |
| | | | 382/103 |
| 2008/0243378 A1 | 10/2008 | Zavoli | |
| 2008/0262721 A1 | 10/2008 | Guo et al. | |
| 2012/0310516 A1 | 12/2012 | Zeng | |

OTHER PUBLICATIONS

Tao, "Mobile Mapping Technology for Road Network Data Acquisition", Journal of Geospatial Engineering vol. 2 No. 2, Dec. 2000, pp. 1-14.*
Cappelle et al., "Outdoor Obstacle Detection and Localisation with Monovision and 3D Geographical Database", 2007 IEEE Intelligent Transportation Systems Conference, Sep. 2007, pp. 1102-1107.*
Extended European Search Report for European Application No. EP 14196915.4, Completed by the European Patent Office, dated Jun. 2, 2015, 6 Pages.

* cited by examiner

METHOD AND SYSTEM FOR IMPROVING ACCURACY OF DIGITAL MAP DATA UTILIZED BY A VEHICLE

CROSS-REFERENCE TO RELATED APPLICATIONS

This application claims foreign priority benefits under 35 U.S.C. § 119(a)-(d) to European patent application number EP 14196915.4, filed Dec. 9, 2014, which is incorporated by reference in its entirety.

TECHNICAL FIELD

The present disclosure relates to a digital map enhancement system and a method performed therein for improving accuracy of pre-stored digital map data of a digital map adapted to be utilized by a vehicle.

BACKGROUND

In recent years, development of navigation systems based on e.g. GPS and digital maps has been, and increasingly is, growing rapidly. The accuracy of GPS receivers has improved, and at the same time, the road coverage of digital maps has been extended and bundled with large amounts of data about the road network, while its accuracy has improved. The accuracy and amount of information contained in digital maps is constantly evolving, offering a large amount of knowledge about the road network.

In addition to road network topography, digital maps may be able to carry large amounts of information describing the characteristics of the road, such as speed limit, number of lanes, curvature, slope, tunnels, lane dividers, traffic signs etc. Accordingly, digital maps may be useful to many in-vehicle applications, such as autonomous driving, active cruise control, vehicle energy management and/or collision mitigation, in that digital map information about the road being driven may be extracted, and potentially presented to the applications.

US 2008/0243378, for instance, discloses a navigation system for a vehicle, including a position sensor, other sensors such as a camera, laser scanner and/or radar, and a digital map comprising records of the vehicle's surrounding objects. The vehicle location is determined, subsequently supporting features such as enhanced driving directions, collision avoidance and/or automatic assisted driving.

However, although US 2008/0243378 enables positioning of the vehicle; in order to exploit the opportunities provided in current and future digital maps to support e.g. active safety applications, improved data accuracy is of most importance.

SUMMARY

It is therefore an object of embodiments herein to provide an approach improving accuracy of digital map data of a digital map adapted to be utilized by one or more vehicles.

According to a first embodiment, the object is achieved by a method performed by a digital map enhancement system for improving accuracy of pre-stored digital map data of a digital map adapted to be utilized by a vehicle. The digital map enhancement system determines a current position of the vehicle. The digital map enhancement system furthermore identifies, in the pre-stored digital map data, a mapped digital landmark representing a stationary landmark predicted to be in the vicinity of the current position of the vehicle, which mapped digital landmark comprises a pre-stored position of the stationary landmark. Moreover, the digital map enhancement system detects the stationary landmark by means of one or more sensor devices on-board the vehicle, which one or more sensor devices are adapted for observing the surroundings of the vehicle, i.e. the one or more sensor devices are adapted to gather information about the surroundings of the vehicle in any suitable manner. The digital map enhancement system further determines a detected position of the stationary landmark based on the current position of the vehicle and the detection discussed above of the stationary landmark. Moreover, the digital map enhancement system updates the pre-stored position comprised in the mapped digital landmark, with the detected position of the stationary landmark.

Thereby, there is introduced an approach according to which a position of a stationary landmark pre-stored in a corresponding mapped digital landmark of the map data, is replaced by a position of said stationary landmark determined based on detection of the stationary landmark by one or more sensor devices on-board the vehicle. Accordingly, the pre-stored position comprised in the digital landmark is replaced with a position value, which value may be considered more precise than the old value. That is, the pre-stored position of the stationary landmark may, for one reason or another, be more or less incorrect. Thus, on subsequently determining a position of the stationary landmark based on detection of the stationary landmark by the sensor device(s), which detected position may be judged to be more correct than the pre-stored position, the detected position may replace the pre-stored position comprised in the mapped digital landmark, whereby more accurate road information is provided in the digital map.

It should be noted that if the position of a second digital landmark on a digital map has been derived from the position of a first digital landmark, then the position of that second digital landmark may be automatically updated as soon as the position of the first digital landmark is updated. A plurality of digital landmarks may of course be automatically updated in this manner once a more accurate position of a stationary landmark has been determined.

Accordingly, by continuously and/or intermittently repeating the introduced method, the map data content may successively become more precise.

For that reason, an approach is provided improving accuracy of map data of a digital map adapted to be utilized by one or more vehicles.

The technical features and corresponding advantages of the above mentioned method will be discussed in further detail in the following.

By introducing a method performed by a digital map enhancement system for improving accuracy of pre-stored digital map data of a digital map adapted to be utilized by a vehicle, an approach is provided which assists in providing a vehicle with a digital map comprising more precise map data. The word "vehicle" may refer to any arbitrary vehicle, and may for instance refer to an engine-propelled vehicle, such as car, truck, lorry, van, bus, motorcycle, scooter, tractor, golf cart, military vehicle, vessel, boat etc., a railbound vehicle, such as e.g. a train or tram, or a bicycle. The vehicle may moreover be an autonomous vehicle adapted for autonomous driving. The concept of autonomous driving relates to that the vehicle, at least to some extent, is driven without human interaction. That is, the vehicle may have an automation level of e.g. 0%<automation level≤100%, wherein 0% may represent that the vehicle is driven by a driver only, and 100% that the vehicle is driven completely autonomously. When having an automation level anywhere between 0% and 100%, the vehicle may autonomously perform some actions, as e.g. keeping a suitable distance to the vehicle ahead, while the driver may perform other actions, such as e.g. overtaking another vehicle when appropriate. The closer to 100%, the more actions are performed autonomously by the vehicle. An autonomous vehicle, also commonly known as an autonomously driven vehicle, driverless vehicle, self-driving vehicle, or robot vehicle, is known to sense it's surrounding with such techniques as e.g. radar, lidar, GPS and/or computer vision. Said vehicle may accordingly further comprise, or have on-board, commonly known sensors, and/or moreover a commonly known positioning system, such as a GPS positioning system and/or a GNSS positioning system, navigation system or the like.

Moreover, the vehicle may be adapted to have online abilities, for instance by supporting Wifi functionality, or by being adapted to be in radio communication with a radio communications network, such as a cellular communications network, e.g. LTE, EDGE, CDMA, 4G, 3G, GPRS, or GSM, e.g. via an infotainment system of the vehicle, and/or via an optional mobile device on-board the vehicle. The optional "mobile device" may have navigating abilities, and may further refer to, for instance, a multi-functional smart phone, mobile phone, mobile terminal or wireless terminal, portable computer such as a laptop, PDA or tablet computer, surf plate such as an iPad, Pocket PC, and/or mobile navigation device. Moreover, the optional mobile device may be adapted to communicate with the vehicle, for instance with the infotainment system thereof, such that information and/or data may be transferred between the vehicle and the mobile device. Such communication may for instance be accomplished physically, such as via USB connection, and/or wirelessly, such as via Bluetooth, WiFi, or the like; additionally or alternatively, the connection may be accomplished via an intermediate system adapted to communicate with vehicles, for instance a management and/or assisting system such as e.g. Volvo On Call. The optional mobile device may additionally or alternatively be "paired" with the vehicle, and in such case hence be referred to as a "nomadic device". Possibly, in order to be paired, identification of the nomadic device may be necessary, and/or authentication of the vehicle occupant. While the nomadic device is paired, the vehicle occupant may commonly utilize functionality of the nomadic device via e.g. the infotainment system.

The digital map enhancement system may, for instance, be at least partly comprised in the vehicle, for instance in one or more control units (CPUs) thereof. Additionally or alternatively, the digital map enhancement system may, at least partly, be comprised in the optional mobile device discussed above, which mobile device may be taken on-board the vehicle. Moreover, additionally or alternatively, the digital map enhancement system may be distributed, such that at least a portion of the digital map enhancement system may be arranged remotely from the vehicle, for instance in one or more databases, and/or servers, which for instance may support cloud functionality and/or crowd sourcing.

Moreover, the expression "digital map", onto which a position of the vehicle may be mapped, may refer to a digital map comprising digital map data, as commonly known in the art. The digital map and/or the digital map data thereof may be stored at any arbitrary location accessible by the vehicle, for instance locally on-board the vehicle and/or remotely therefrom, as indicated above. Furthermore, the expression "pre-stored" digital map data may refer to map data of said digital map being stored in advance, for instance prior to performing one or more of the actions of the introduced method, and/or prior to the current moment. The map data may for instance, initially, have been gathered by a reference vehicle, such as for instance a cartography vehicle, configured for acquiring detailed map data with support from techniques known in the art. Moreover, the expression map data of a digital map adapted "to be utilized" by a vehicle, may refer to the map data of the digital map being intended, and configured, for use of the vehicle, and/or a plurality of vehicles, such as being "accessible" by said vehicle(s). Furthermore, the expression "improving accuracy of pre-stored digital map data" may refer to providing updated map data of more exactness and/or preciseness.

Since the digital map enhancement system determines a current position of the vehicle, a prevailing location of the vehicle, such as a current global position, is established. The vehicle position, and/or optionally the position of the optional mobile device on-board the vehicle, may be determined in any arbitrary known manner, for instance with support from commonly known positioning techniques, such as for instance global positioning techniques, sensor techniques, Wifi positioning techniques, triangulation techniques and/or forward link timing etc. The vehicle position, and/or the position of the optional mobile device on-board the vehicle, may accordingly be determined, and/or be derived from, the previously discussed optional positioning system of the vehicle, by means of the previously discussed navigating abilities of the optional mobile device, and/or by means the previously discussed optional online abilities of the vehicle and or mobile device.

The position of the vehicle, which for instance is expressed based on global coordinates, based on a longitudinal positioning along e.g. a road, and/or based on a relative position, may be determined repeatedly, continuously, intermittently and/or on request, for instance as the vehicle travels along an arbitrary and/or selected road. Moreover, "determining" the current vehicle position may, for instance, refer to establishing, estimating, retrieving, fetching, deriving, receiving, reading, requesting and/or learning of the current vehicle position. The expression "current position" may, for instance, refer to "prevailing position", "position at a current or prevailing point of time", and/or "position at an essentially current or essentially prevailing point of time". Furthermore, "current position" may likewise include "essentially current position".

Since the digital map enhancement system furthermore identifies, in the pre-stored digital map data, a mapped digital landmark representing a stationary landmark predicted to be in the vicinity of the current position of the vehicle, a pre-stored digital landmark corresponding to a stationary landmark, which is assumed to be in relative closeness to the determined current vehicle position, is identified in the map data. Accordingly, the digital map enhancement system identifies a mapped digital landmark corresponding to a stationary landmark considered to be positioned in the vicinity of the current vehicle position, such as a stationary landmark which the vehicle, within shortly, is assumed to pass, or alternatively, has recently passed. "Identifying" a mapped digital landmark in the map data, which mapped digital landmark represents a stationary landmark predicted to be in the vicinity of the current vehicle position, may be accomplished with support from techniques known in the art, for instance by utilizing vehicle path prediction. "Identifying" a mapped digital landmark may in this context refer to, for instance, deriving, determining, fetching, and/or establishing a mapped digital landmark. The expression "stationary landmark" is here intended to refer to a landmark which is geographically static, that is, remain at essentially the same location over time, e.g. for one or more days as regards temporary structures such as roadworks, or over several years such as more than 2 years as regards more permanent structures, such as buildings and/or road network layout. "Stationary landmark" may further refer to any arbitrary static landmark of arbitrary shape and/or size. Moreover, "stationary landmark" may refer to "stationary road landmark", i.e. a piece of road network layout, such as at least a portion of an extension of a lane, a junction, a crossing, a curvature, a slope, a traffic light, a traffic sign etc., or a combination thereof. "Stationary landmark" may further refer to an arbitrary static physical object, for instance a building, tunnel or a bridge or the like, or at least a portion thereof. Temporary structures, such as roadworks, may be labelled as such in the digital map.

The expression "mapped digital landmark representing a stationary landmark" may throughout this disclosure relate to a digital map data landmark matching, reflecting and/or representing a corresponding stationary landmark. That is, once a stationary landmark, and subsequently e.g. its characteristics and/or attributes, have been acquired and stored to the digital map, for instance initially by means of the reference vehicle discussed above, it may throughout this disclosure be referred to as a "mapped digital landmark". Moreover, the expression of the stationary landmark "predicted" to be in the vicinity of the current position of the vehicle, may refer to a stationary landmark which is assumed, estimated, considered, judged, determined and/or known to be in the vicinity of the current vehicle position. Furthermore, the expression of the stationary landmark being predicted to be "in the vicinity of" the current position of the vehicle, may refer to the stationary landmark being predicted to be "detectable by the vehicle at", "within sight of the vehicle at", "close to", "within a distance from" and/or "within a same region as", the current position of the vehicle. Said distance may be represented by for instance 5, 50, or 500 meters, whereas said region may refer to for instance an arbitrary shaped and/or sized geographical area. Moreover, "within vicinity of" may refer to "ahead of".

Since the mapped digital landmark comprises a pre-stored position of the stationary landmark, a pre-established location of said stationary landmark is incorporated in the mapped digital landmark. Thereby, the digital map enhancement system may be made aware of a predetermined pre-stored position of the stationary landmark. The pre-stored position of the stationary landmark, e.g. a global position, may for instance be comprised in an attribute of the mapped digital landmark. Furthermore, the pre-stored position of the stationary landmark may, for instance, be expressed based on global coordinates, based on a longitudinal positioning along e.g. a road, and/or based on a relative position. Moreover, the position of the stationary landmark may, initially, have been determined and/or estimated in any arbitrary known manner, for instance by means of the reference vehicle discussed above, and subsequently stored in the map data of the digital map to be comprised in the mapped digital landmark. The expression "pre-stored" position may refer to the determined and/or estimated position of the stationary landmark being stored in advance, for instance prior to performing the introduced action of identifying the mapped digital landmark, and/or prior to a current moment.

Since the digital map enhancement system detects the stationary landmark by means of one or more sensor devices on-board the vehicle, which one or more sensor devices are adapted for observing the surroundings of the vehicle, the digital map enhancement system senses, captures, discovers and/or finds said stationary landmark utilizing sensor devices provided on the vehicle. Thereby, the stationary landmark predicted to be in the vicinity of the current position of the vehicle is detected from the vehicle, optionally from the previously discussed mobile device on-board the vehicle. That is, the one or more sensor devices may, for instance, be comprised in the vehicle, and/or be mounted thereto. Additionally or alternatively, at least one of the one or more sensor devices may be comprised in, and/or attached to, the optional mobile device. The sensor device(s) may be arbitrarily arranged throughout the vehicle, for instance arranged in a protected position supporting a substantially clear view, such that a clear view of the surroundings of the vehicle, may be provided. For instance, at least one sensor device may be arranged behind the windscreen, in the vicinity of or embedded with e.g. a rear view mirror.

Moreover, detecting the stationary landmark may be accomplished by means of techniques known in the art, and the expression "sensor device" may hence refer to any arbitrary sensing equipment adapted to observe and/or sense the surroundings of the vehicle. The expression "observing the surroundings of the vehicle" may refer to sensing, scanning and/or tracking an area nearby, in the vicinity of, near, and/or close to the vehicle, for instance within 5, 50 or 500 meters of the vehicle. According to an example, the "sensor device" may comprise a "front looking sensor device" and/or a "forward looking sensor device", adapted for observing the surroundings of the vehicle in an essentially forward-looking direction the vehicle.

According to an example, "detecting the stationary landmark" may comprise "detecting a stationary landmark in the surroundings of the vehicle, and determining that said stationary landmark matches said mapped digital landmark". Determining and/or estimating that the detected stationary landmark in the surroundings of the vehicle matches the mapped digital landmark, may be accomplished with support from techniques known in the art, such as by utilizing positioning as discussed above, in combination with comparing e.g. characteristics and/or attributes of the detected stationary landmark with mapped characteristics and/or attributes of the mapped digital landmark.

Since the digital map enhancement system further determines a detected position of the stationary landmark based on the current position of the vehicle and the previously discussed detection of the stationary landmark, there is established a detected location of the stationary landmark, which location is based on the detection by the one or more sensor devices. Thereby, by taking into consideration the current vehicle position in combination with the detected stationary landmark, a detected position of the stationary landmark, such as a global position thereof, is determined. "Determining" may in this context refer to, for instance, calculating, deriving and/or establishing. Moreover, the expression "based on" may here refer to, for instance, considering, taking into account and/or utilizing. When determining the detected position of the stationary landmark, in the scenario of two or more sensor devices being utilized for detecting the stationary landmark, the input from the respective sensor devices may be considered equally and/or weighted depending on e.g. the respective different type of sensor device. Additionally or alternatively, the input from the respective sensor devices may be considered equally and/or weighted depending on e.g. the situation at hand, such as current conditions and/or characteristics associated with the stationary landmark in question, and/or the current position of the vehicle.

According to an example, "determining a detected position" may comprise "determining a distance and/or an angle from the current position of the vehicle to the detected stationary landmark, and determining a detected position of the stationary landmark based on said determined distance and/or said determined angle". Determining said distance and/or said angle may be accomplished with support from techniques known in the art, such as by sensing the distance and/or angle by means of the one or more sensor devices.

Since the digital map enhancement system updates the pre-stored position comprised in the mapped digital landmark, with the detected position of the stationary landmark, the position of the stationary landmark pre-stored in the corresponding mapped digital landmark, is replaced by a value indicating the position of said stationary landmark determined based on detection of the stationary landmark by the one or more sensor devices on-board the vehicle. Thereby, the map data of the digital map is updated with a new value, namely said detected position of the stationary landmark. Accordingly, the pre-stored position comprised in the digital landmark is replaced with a position value, for instance expressed based on global coordinates, based on a longitudinal positioning along e.g. a road, and/or based on a relative position, which value may be considered more correct than the old value. That is, the pre-stored position of the stationary landmark may, for one reason or another, be more or less incorrect. Thus, on subsequently determining a position of the stationary landmark based on detection of the stationary landmark by the sensor device(s), which detected position may be established to be more correct than the pre-stored position, the detected position may replace the pre-stored position comprised in the mapped digital landmark, whereby more accurate road information is provided in the digital map. Accordingly, by continuously and/or intermittently repeating the introduced method, the map data content may successively become more precise.

It should be noted that the pre-stored position not necessarily is updated with the detected position, for instance should the detected position be considered to be less accurate than the pre-stored position. Moreover, "updating" may, for instance, refer to replacing and/or exchanging.

It should furthermore be noted that the updated digital map data, for instance, as previously indicated, may be stored remotely from the vehicle, and/or be distributed by means of e.g. cloud functionality and/or crowd sourcing. Said updated map data may accordingly be utilized by other vehicles than the vehicle involved in the action of updating the pre-stored position.

According to an embodiment, the digital map enhancement system may further determine that an accuracy confidence level value of the detected position is greater than a predetermined accuracy threshold. Thereby, the digital map enhancement system may compare an established value indicting confidence in the correctness of the detected position, with a pre-established threshold, and provided that said accuracy confidence level value is greater than said predetermined accuracy threshold, the digital map enhancement system may subsequently update the pre-stored position of the stationary landmark with the detected position of the stationary landmark. Accordingly, it may be ascertained that the pre-stored position is updated with the detected position only if the accuracy confidence level value of the detected position is greater than the pre-set value of the accuracy threshold. Consequently, it may be ascertained that only detected positions of sufficient and/or satisfying accuracy confidence level values may replace said pre-stored position.

The "accuracy confidence level value", which may be expressed in percentage, may refer to a value representing a level of confidence of the correctness of the detected position. That is, depending on how confident the digital map enhancement system is of the correctness of the detected position of the stationary landmark, the higher the accuracy confidence level value may be established to be. Accordingly, the accuracy confidence level value of the detected position may be affected by the situation at hand, such as current conditions and/or characteristics associated with the stationary landmark in question, the current position of the vehicle, and/or the one or more sensor devices utilized.

Correspondingly, a selected value of the "predetermined accuracy threshold" may depend on the situation at hand, such as current conditions and/or characteristics associated with the stationary landmark in question, the mapped digital landmark in question, the current position of the vehicle, and/or the one or more sensor devices. That is, the accuracy threshold may e.g. be set higher the closer to the current vehicle position the detected stationary landmark is located, and/or the higher the performance of the sensor device(s). Accordingly, the predetermined accuracy threshold may be arbitrarily set, may be adjustable, may be arbitrarily stored in a memory, and/or may be expressed in e.g. percentage. The accuracy threshold may, for instance, be set to at least 50 percent, at least 70 percent, at least 90 percent and/or at least 95 percent. Moreover, the expression "determining" that an accuracy confidence level value of the detected position is greater than a predetermined accuracy threshold, may in this context refer to, for instance, "calculating" and/or "comparing" that an accuracy confidence level value of the detected position is greater than a predetermined accuracy threshold. "Predetermined" may in this context refer to, for instance, pre-set and/or pre-established.

According to an example, the expression "determining that an accuracy confidence level value of the detected position is greater than a predetermined accuracy threshold" may comprise "determining an accuracy confidence level value of the detected position, comparing said accuracy confidence level value with a predetermined accuracy threshold, and determining that said accuracy confidence level value is greater than said predetermined accuracy threshold".

According to an embodiment, the accuracy confidence level value may be based on a magnitude of a distance between the determined current position of the vehicle and the detected position of the stationary landmark. Thereby, the accuracy confidence level value may depend on how far away from the detected stationary landmark the current vehicle position is estimated to be situated. For instance, the closer to the detected stationary landmark, the higher may the accuracy confidence level value be determined to be. That is, at a current vehicle position with a distance fairly close to the stationary landmark, for instance 50, 5 or 0 meters therefrom, and/or when essentially passing the stationary landmark, the sensor device(s) on-board the vehicle may be relatively accurate in detecting the stationary landmark, whereby determining of e.g. a distance and/or an angle to the stationary landmark, and subsequently the detected position, may be determined fairly accurately.

Additionally or alternatively, the accuracy confidence level value may be based on type and/or types of the one or more sensor devices. Thereby, the accuracy confidence level value may depend on what type of sensor device and/or sensor devices are utilized to detect the stationary landmark. For instance, the more reliable the sensor device(s) is considered to be, the higher performance the sensor device(s) is considered to have, and/or the more accurately the sensor device(s) is considered to be able to detect the stationary landmark, the higher may the accuracy confidence level value be determined to be. That is, a high-performance sensor device(s) on-board the vehicle may be relatively accurate in detecting the stationary landmark, whereby determining of e.g. a distance and/or an angle to the stationary landmark, and subsequently the detected position, may be determined fairly accurately. Thus, in the scenario of two or more sensor devices being utilized for detecting the stationary landmark, the accuracy confidence level values of the respective sensor devices may be considered independently, equally and/or weighted depending on the respective different type of sensor device.

Additionally or alternatively, the accuracy confidence level value may be based on number of one or more sensor devices. Thereby, the accuracy confidence level value may depend on how many sensor devices are utilized to detect the stationary landmark. The greater number of sensor devices detecting the stationary landmark, the more reliable may the accuracy confidence level value be, provided that the respective sensor devices provides essentially similar detecting results.

Additionally or alternatively, the accuracy confidence level value may be based on a value of at least one previous accuracy confidence level value. Thereby, the accuracy confidence level value may depend on a previously determined accuracy confidence level value(s) associated with detection of the stationary landmark. In considering such previous accuracy confidence level value(s), the more reliable a current accuracy confidence level value may be considered to be, provided that the former accuracy confidence level value(s) indicate a similar level and/or increasing level of accuracy. Thus, in the scenario of the vehicle e.g. approaching a stationary landmark, with the digital map enhancement system detecting the stationary landmark e.g. continuously and/or intermittently, and determining one or more respective accuracy confidence level values associated with each respective detection action, a current accuracy confidence level value may be considered more or less reliable depending on the previous accuracy confidence level value(s).

According to a further embodiment, the digital map enhancement system may further determine that an accuracy confidence level value of the detected position is greater than an accuracy confidence level value of the pre-stored position. Thereby, the digital map enhancement system may compare an established value indicting confidence in the correctness of the detected position, with a pre-stored accuracy confidence level value of the pre-stored position, and provided that said accuracy confidence level value is greater than said accuracy confidence level value of the pre-stored position, the digital map enhancement system may subsequently update the pre-stored position of the stationary landmark with the detected position of the stationary landmark. Accordingly, it may be ascertained that the pre-stored position is updated with the detected position of the stationary landmark only if the accuracy confidence level value of the detected position is greater than the pre-stored accuracy confidence level value of the pre-stored position. Thereby, the pre-stored position may successively be updated to a detected position of successively increasing accuracy confidence level value.

The "accuracy confidence level value of the pre-stored position", which may be expressed in percentage, may refer to a pre-stored value representing a level of confidence of the correctness of the pre-stored position. That is, depending on the confidence of the correctness of the pre-stored position of the stationary landmark, the higher value the accuracy confidence level value may be set to. The pre-stored value of the accuracy confidence level value of the pre-stored position may hence depend on under what circumstances it was determined. The accuracy confidence level value of the pre-stored position may be arbitrarily stored, for instance as an attribute of the mapped digital landmark, and/or in an arbitrarily located memory accessible by the digital map enhancement system, for instance in an exemplifying landmark position table. The expression "determining" that an accuracy confidence level value of the detected position is greater than an accuracy confidence level value of the pre-stored position, may in this context refer to, for instance, "calculating" and/or "comparing" that an accuracy confidence level value of the detected position is greater than an accuracy confidence level value of the pre-stored position.

According to an example, the expression "determining that an accuracy confidence level value of the detected position is greater than an accuracy confidence level value of the pre-stored position" may comprise "determining an accuracy confidence level value of the detected position, comparing said accuracy confidence level value with an accuracy confidence level value of the pre-stored position, and determining that said accuracy confidence level value is greater than said accuracy confidence level value of the pre-stored position".

According to another embodiment, the digital map enhancement system may detect the stationary landmark discussed above by means of one or more of a vision sensor, radar sensor, and/or laser sensor. Thereby, the digital map enhancement system may sense, capture, discover and/or find said stationary landmark utilizing one or more sensor devices comprising one or more sensors suitable for sensing, detecting, scanning, and/or tracking the surroundings of the vehicle. Accordingly, the stationary landmark predicted to be in the vicinity of the current position of the vehicle may be detected from the vehicle by means of the vision sensor(s), radar sensor(s) and/or laser sensor(s). Detecting the stationary landmark based on utilizing the vision sensor(s), radar sensor(s) and/or laser sensor(s), may be accomplished as commonly known in the art.

The vision sensor(s), radar sensor(s) and/or laser sensor(s) may, for instance, be comprised in the vehicle, and/or mounted thereto. Additionally or alternatively, at least one of the vision sensor(s), radar sensor(s) and/or laser sensor(s) may be comprised in, and/or attached to, the optional mobile device. The vision sensor(s), radar sensor(s) and/or laser sensor(s) may be arbitrarily arranged throughout the vehicle, for instance arranged in a protected position supporting a substantially clear view, such that a clear view of the surroundings of the vehicle may be provided. For instance, at least one vision sensor(s), radar sensor(s) and/or laser sensor(s) may be arranged behind the windscreen, in the vicinity of or embedded with e.g. a rear view mirror. Moreover, according to an example, the one or more vision sensor(s), radar sensor(s) and/or laser sensor(s) may be adapted for observing the surroundings of the vehicle in an essentially forward-looking direction the vehicle.

According to yet another embodiment, the digital map enhancement system may determine the previously discussed current position of the vehicle based on input from a positioning system on-board the vehicle. Thereby, the prevailing location of the vehicle, and/or the position of the optional mobile device on-board the vehicle, is established by utilizing a positioning system, such as a GPS positioning system and/or a GNSS positioning system. The vehicle position, and/or the position of the optional mobile device on-board the vehicle, may accordingly be determined, and/or be derived from, the previously discussed optional positioning system of the vehicle, and/or by means of the previously discussed navigating abilities of the optional mobile device. The position of the vehicle may be determined repeatedly, continuously, intermittently and/or on request, for instance as the vehicle travels along an arbitrary and/or selected road. Moreover, "determining" the current vehicle position may, for instance, refer to establishing, estimating, retrieving, fetching, deriving, receiving, reading, requesting and/or learning of the current vehicle position from said positioning system.

According to still another embodiment, the digital map enhancement system may identify the mapped digital landmark discussed above based on the Electronic Horizon technology, an equivalent thereof, and/or a successor thereof. Thereby, the mapped digital landmark may be identified in a known and standardized manner. That is, the "Electronic Horizon technology"—which may be referred to as the Electronic Horizon concept or concepts, and/or the Electronic Horizon standard and/or standards—or an equivalent and/or a successor thereof, may enable the most relevant digital map data at the current vehicle position to be extracted and/or interpreted in an efficient manner, for instance by creating a virtual view of the road ahead. Furthermore, the Electronic Horizon technology, or an equivalent and/or a successor thereof, may enable prediction of where the vehicle is heading, and moreover reduce a 360 degree electronic horizon down to e.g. a single virtual linear road, e.g. based on the commonly known MPP functionality (Most Probable Path).

According to a second embodiment, the object is achieved by a digital map enhancement system adapted for improving accuracy of pre-stored digital map data of a digital map adapted to be utilized by a vehicle. The digital map enhancement system comprises a vehicle position determining unit adapted for determining a current position of the vehicle. The digital map enhancement system furthermore comprises a mapped data identifying unit adapted for identifying, in the pre-stored digital map data, a mapped digital landmark representing a stationary landmark predicted to be in the vicinity of the current position of the vehicle, which mapped digital landmark comprises a pre-stored position of the stationary landmark. Moreover, the digital map enhancement system comprises a landmark detecting unit adapted for detecting the stationary landmark by means of one or more sensor devices on-board the vehicle, which one or more sensor devices are adapted for observing the surroundings of the vehicle. The digital map enhancement system further comprises a landmark position determining unit adapted for determining a detected position of the stationary landmark based on the current position of the vehicle and the detection discussed above of the stationary landmark. Moreover, the digital map enhancement system comprises a landmark position updating unit adapted for updating the pre-stored position comprised in the mapped digital landmark, with the detected position of the stationary landmark.

According to an embodiment, the digital map enhancement system may further comprise a position accuracy determining unit adapted for determining that an accuracy confidence level value of the detected position is greater than a predetermined accuracy threshold. The accuracy confidence level value may be based on a magnitude of a distance between the determined current position of the vehicle and the detected position of the stationary landmark. Additionally or alternatively, the accuracy confidence level value may be based on type and/or types of the one or more sensor devices. Additionally or alternatively, the accuracy confidence level value may be based on number of one or more sensor devices. Additionally or alternatively, the accuracy confidence level value may be based on a value of at least one previous accuracy confidence level value.

According to a further embodiment, the digital map enhancement system may further comprise an accuracy comparing unit adapted for determining that an accuracy confidence level value of the detected position is greater than an accuracy confidence level value of the pre-stored position.

According to another embodiment, the landmark detecting unit may further be adapted for detecting the stationary landmark by means of one or more of a vision sensor, radar sensor, and/or laser sensor.

According to yet another embodiment, the vehicle position determining unit may further be adapted for determining the current position based on input from a positioning system on-board the vehicle.

According to still another embodiment, the mapped data identifying unit may further be adapted for identifying the mapped digital landmark based on the Electronic Horizon technology, an equivalent thereof, and/or a successor thereof.

Similar advantages as those mentioned in the foregoing in relation to the first embodiment correspondingly apply to the second.

According to a third embodiment, the object is achieved by a vehicle comprising at least a portion of the digital map enhancement system discussed above.

Once more, similar advantages as those mentioned in the foregoing in relation to the first embodiment correspondingly apply to the third.

According to a fourth embodiment, the object is achieved by a mobile device comprising at least a portion of the digital map enhancement system discussed above. Again, similar advantages as those mentioned in the foregoing in relation to the first embodiment correspondingly apply to the fourth.

According to a fifth embodiments, the object is achieved by a computer program product comprising a computer program containing computer program code means arranged to cause a computer or a processor to execute the steps of the digital map enhancement system discussed above, stored on a computer-readable medium or a carrier wave. Yet again, similar advantages as those mentioned in the foregoing in relation to the first embodiment correspondingly apply to the fifth.

BRIEF DESCRIPTION OF THE DRAWINGS

Various non-limiting embodiments of the present disclosure, including particular features and advantages, will be readily understood from the following detailed description and the accompanying drawings, in which.

DETAILED DESCRIPTION

Figure 1:
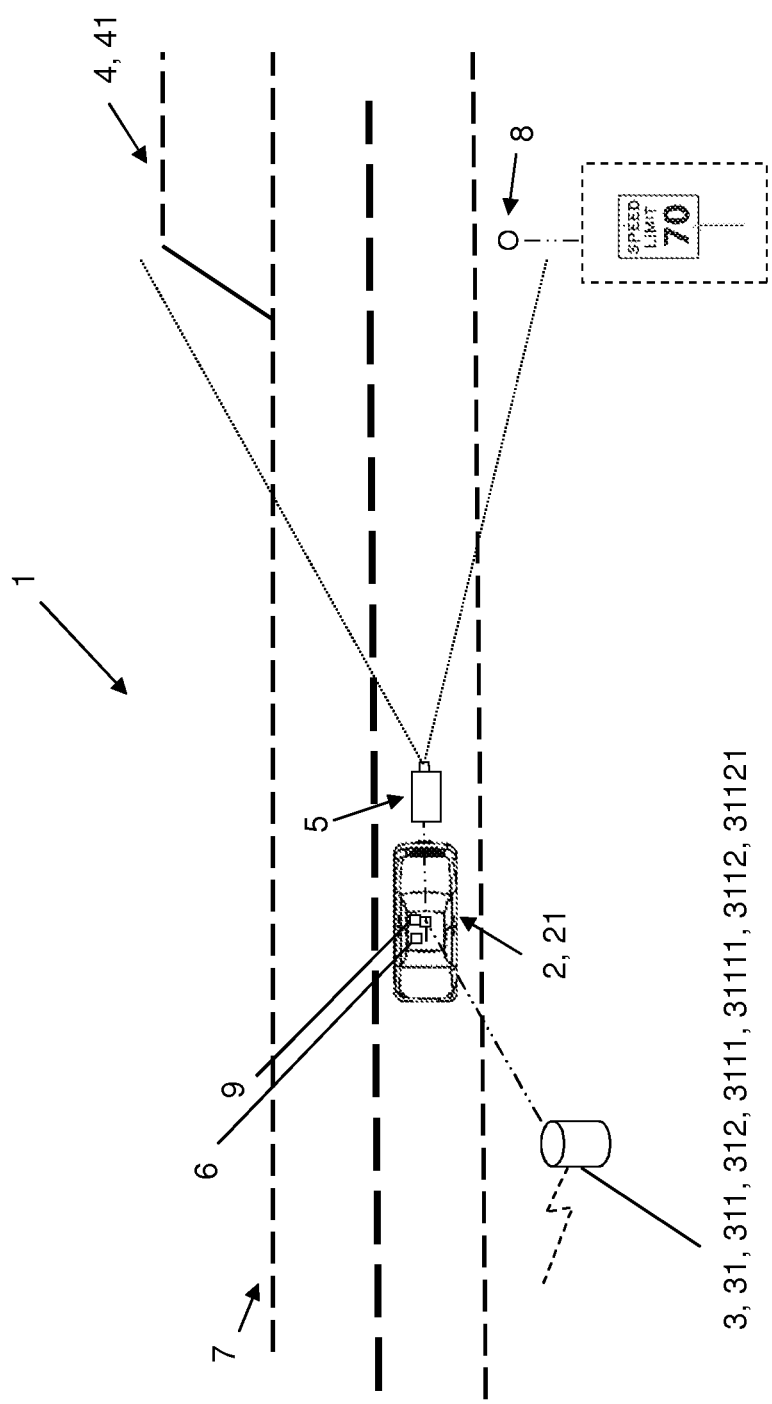
FIG. 1 illustrates a schematic overview of an exemplifying digital map enhancement system according to embodiments of the disclosure.

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

The non-limiting embodiments of the present disclosure will now be described more fully hereinafter with reference to the accompanying drawings, in which embodiments of the disclosure are shown. This disclosure may, however, be embodied in many different forms and should not be construed as limited to the embodiments set forth herein. Like reference characters refer to like elements throughout. Dashed lines of some boxes in the figures indicate that these units or actions are optional and not mandatory.

In the following, according to embodiments herein which relate to improving accuracy of pre-stored digital map data of a digital map adapted to be utilized by a vehicle, there will be disclosed that the inventive concept provides the digital map with more accurate road information.

Referring now to the figures and FIG. 1 in particular, there is depicted a schematic overview of an exemplifying digital map enhancement system 1 according to embodiments of the disclosure. The digital map enhancement system 1, which will be described in further detail later on in this description, may at least partly be comprised in a vehicle 2; here an autonomous car. Additionally or alternatively, the digital map enhancement system 1 may at least partly be comprised in a mobile device 9 on-board the vehicle 2. The vehicle 2 is here situated at a determined current vehicle position 21.

The digital map enhancement system 1 is adapted for improving accuracy of pre-stored digital map data 311 of a digital map 31 adapted to be utilized by the vehicle 2. The map data 311 and/or the digital map 31 may be comprised in an optional map database 3. The map data 311 here comprises a mapped digital landmark 3111 representing a stationary landmark 4 predicted to be in the vicinity of the current position 21 of the vehicle 2. The mapped digital landmark 3111 comprises a pre-stored position 31111 of the stationary landmark 4. Optionally, the pre-stored position 31111 may be associated with an accuracy confidence level value, which value may indicate a level of confidence of the correctness of the pre-stored position 31111, as compared to the de facto position of the stationary landmark 4. The stationary landmark 4 is here represented by an exemplifying extension of a lane. Moreover, the stationary landmark 4 is, as will described in further detail later on in this description, determined to be located at a detected position 41.

The vehicle 2 has on-board one or more sensor devices 5 adapted for observing the surroundings of the vehicle 2. The one or more sensor devices 5 may comprise one or more of a vision sensor, radar sensor, and/or laser sensor. Here, at least one of the one or more sensor devices 5 is comprised in a rearview mirror of the vehicle 2.

According to the shown embodiment, the vehicle 2 furthermore has on-board a positioning system 6, based on which the current position 21 of the vehicle 2 may be determined. The vehicle 2 is currently travelling on an exemplifying road 7, along which the stationary landmark 4 is situated. The exemplifying road 7 may be represented by any suitable surface intended for vehicle driving, for instance autonomous driving, and the road 7 may be of any shape, width and length, and comprise any arbitrary number of lanes, intersections, cross sections etc.

Furthermore depicted in FIG. 1 is, along the exemplifying road 7, an exemplifying second stationary landmark 8 predicted to be in the vicinity of the current position 21 of the vehicle 2. Correspondingly, the map data 311 here comprises a second mapped digital landmark 3112 representing the second stationary landmark 8. The second mapped digital landmark 3112 comprises a second pre-stored position 31121 of the second stationary landmark 8. The second stationary landmark 8 is here represented by an exemplifying traffic sign.

Moreover, the digital map 31 may optionally comprise, and/or be associated with, an exemplifying landmark position table 312, which will be described in further detail in conjunction with FIG. 2 below.

Figure 2:
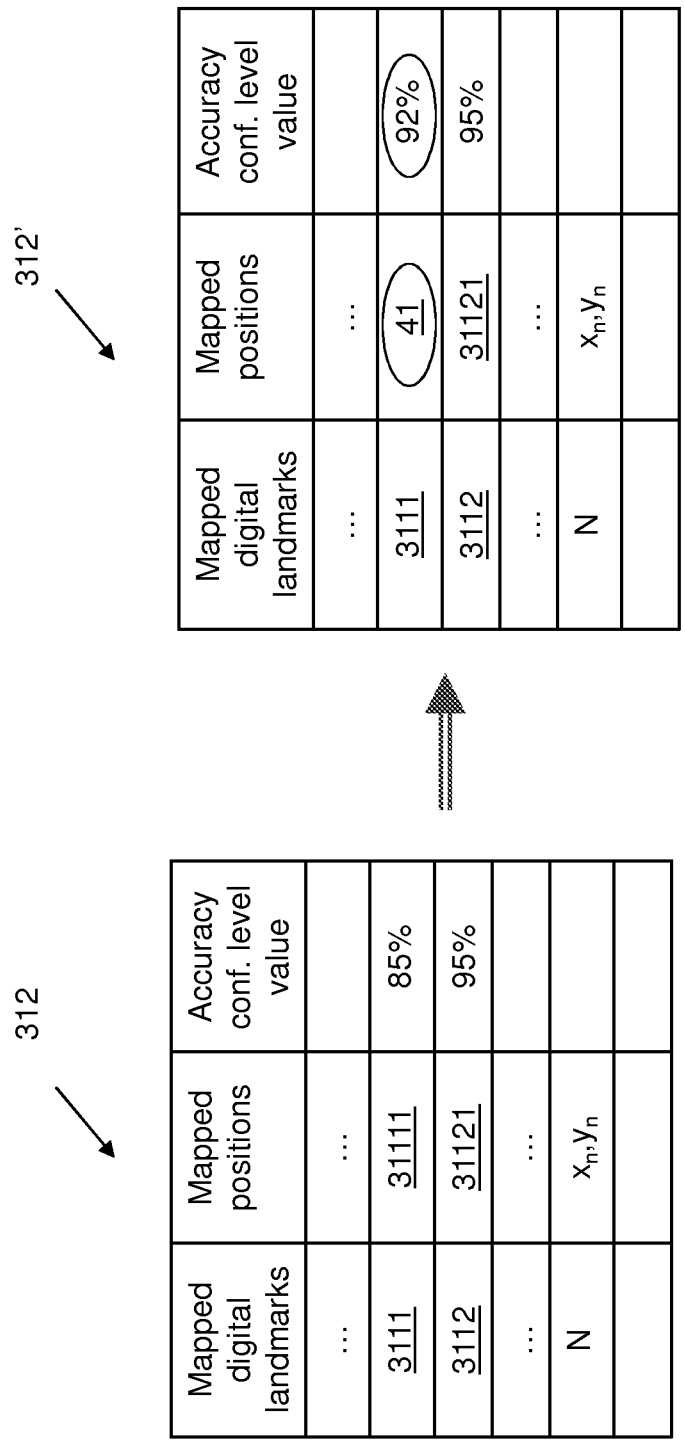
FIG. 2 illustrates a schematic overview of an exemplifying optional landmark position table according to embodiments of the disclosure.

FIG. 2 illustrates a schematic overview of the exemplifying optional landmark position table 312 according to embodiments of the disclosure. The landmark position table 312, or a similar arbitrarily arranged data table, matrix and/or set, may be arbitrarily stored in memory, for instance be comprised in the map database 3, the digital map 31, and/or the map data 311. The landmark position table 312 may hold information on mapped digital landmarks 3111, 3112, which corresponds to stationary landmarks 4, 8. Moreover, the landmark position table 312 may hold information on mapped positions of said stationary landmarks 4, 8, and optionally, accuracy confidence level values associated therewith. Although not shown in FIG. 2, the exemplifying optional landmark position table 312 may furthermore hold additional information associated with mapped digital landmarks 3111, 3112, such as characteristics and/or attributes of the corresponding stationary landmarks 4, 8.

On the left hand side of FIG. 2, the landmark position table 312 comprises respective pre-stored positions 31111, 31121 of stationary landmarks 4, 8. The pre-stored position 31111 comprised in the mapped digital landmark representing the stationary landmark 4 of FIG. 1, here has an accuracy confidence level value of exemplifying 85%.

On the right hand side of FIG. 2, in an updated landmark position table 312', the pre-stored position 31111 comprised in the mapped digital landmark 3111 representing the stationary landmark 4, has been updated with a value indicating the detected position 41 of the stationary landmark 4. The accuracy confidence level value of the detected position 41 here has a value of exemplifying 92%.

Figure 3:
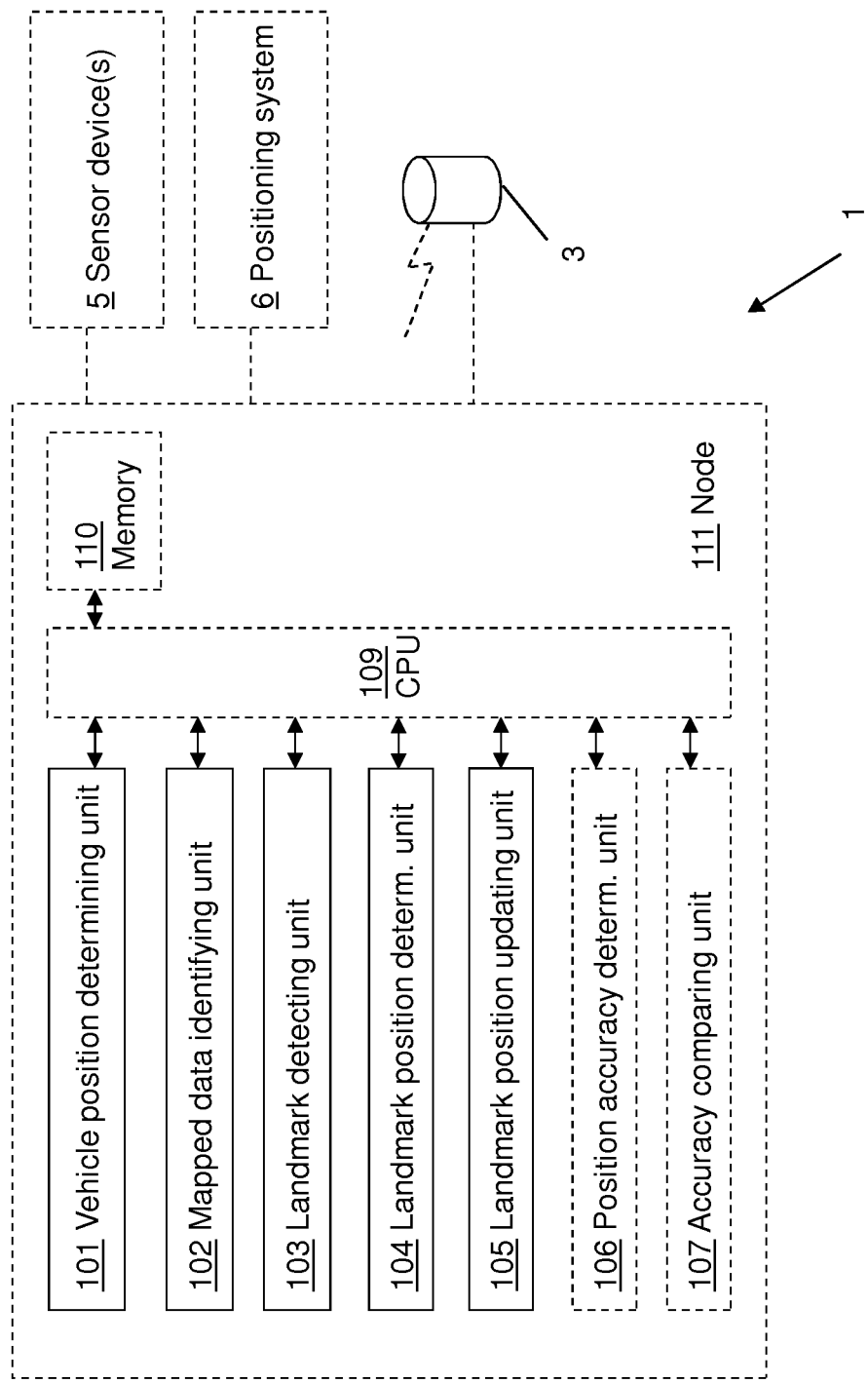
FIG. 3 illustrates a schematic block diagram illustrating an exemplifying digital map enhancement system according to embodiments of the disclosure.

As further shown in FIG. 3, which depicts a schematic block diagram illustrating an exemplifying digital map enhancement system 1 according to embodiments of the disclosure, the map enhancement system 1 is, as previously mentioned in conjunction with FIG. 1, adapted for improving accuracy of pre-stored digital map data 311 of a digital map 31 adapted to be utilized by a vehicle 2. The digital map enhancement system 1 comprises a vehicle position determining unit 101, a mapped data identifying unit 102, a landmark detecting unit 103, a landmark position determining unit 104, and a landmark position updating unit 105, all of which will be described in further detail below.

Moreover, the digital map enhancement system 1 may comprise an optional position accuracy determining unit 106, and/or an accuracy comparing unit 107, which in a similar manner will be described in further detail later on in this description. Furthermore, the embodiments herein for improving accuracy of pre-stored digital map data 311 of a digital map 31 adapted to be utilized by a vehicle 2, may be implemented through one or more processors, such as a processor 109, here denoted CPU, together with computer program code for performing the functions and actions of the embodiments herein. Said program code may also be provided as a computer program product, for instance in the form of a data carrier carrying computer program code for performing the embodiments herein when being loaded into the digital map enhancement system 1. One such carrier may be in the form of a CD ROM disc. It is however feasible with other data carriers such as a memory stick. The computer program code may furthermore be provided as pure program code on a server and downloaded to the digital map enhancement system 1.

The digital map enhancement system 1 may further comprise a memory 110 comprising one or more memory units. The memory 110 may be arranged to be used to store e.g. information, and further to store data, configurations, schedulings, and applications, and for instance a digital map 31, map data 311, a landmark position table 312, mapped digital landmarks 3111, 3112, pre-stored landmark positions 31111, 31121, accuracy confidence level values of pre-stored positions 31111, 31121 etc., to perform the methods herein when being executed in the digital map enhancement system 1.

Furthermore, the vehicle position determining unit 101, the mapped data identifying unit 102, the landmark detecting unit 103, the landmark position determining unit 104, the landmark position updating unit 105, the optional position accuracy determining unit 106, the optional accuracy comparing unit 107, the optional processor 109, and/or the optional memory 110, may for instance be implemented in one or several arbitrary nodes 111, arranged locally on-board the vehicle 2, i.e. comprised in the vehicle and/or in the mobile device 9 adapted to be utilized on-board the vehicle, and/or at least partly implemented remotely therefrom such as in one or more databases and/or servers, which may support e.g. cloud functionality and/or crowd sourcing. A node 111 may be an electronic control unit (ECU) or any suitable generic electronic device, and may involve, for instance, a navigating node or a main central node. The disposition of the functionality between e.g. the node(s) 111 and e.g. remotely arranged databases and/or servers may be arbitrary selected as considered suitable. According to an alternative example, the nodes 111 may, as a complement to being represented by e.g. one or several integrated ECUs, be represented by a plug-in solution, for instance a dongle. In that manner, an aftermarket solution may be provided to any arbitrary vehicle suitable.

Those skilled in the art will also appreciate that the system and/or any of the vearious units described herein, such as the vehicle position determining unit 101, the mapped data identifying unit 102, the landmark detecting unit 103, the landmark position determining unit 104, the landmark position updating unit 105, the optional position accuracy determining unit 106, and/or the optional accuracy comparing unit 107, may refer to a combination of analog and digital circuits, and/or one or more processors configured with software and/or firmware, e.g. stored in a memory such as the memory 110, that when executed by the one or more processors such as the processor 109 perform as will be described in more detail below. One or more of these processors, as well as the other digital hardware, may be included in a single ASIC (Application-Specific Integrated Circuitry), or several processors and various digital hardware may be distributed among several separate components, whether individually packaged or assembled into a SoC (System-on-a-Chip).

Figure 4:
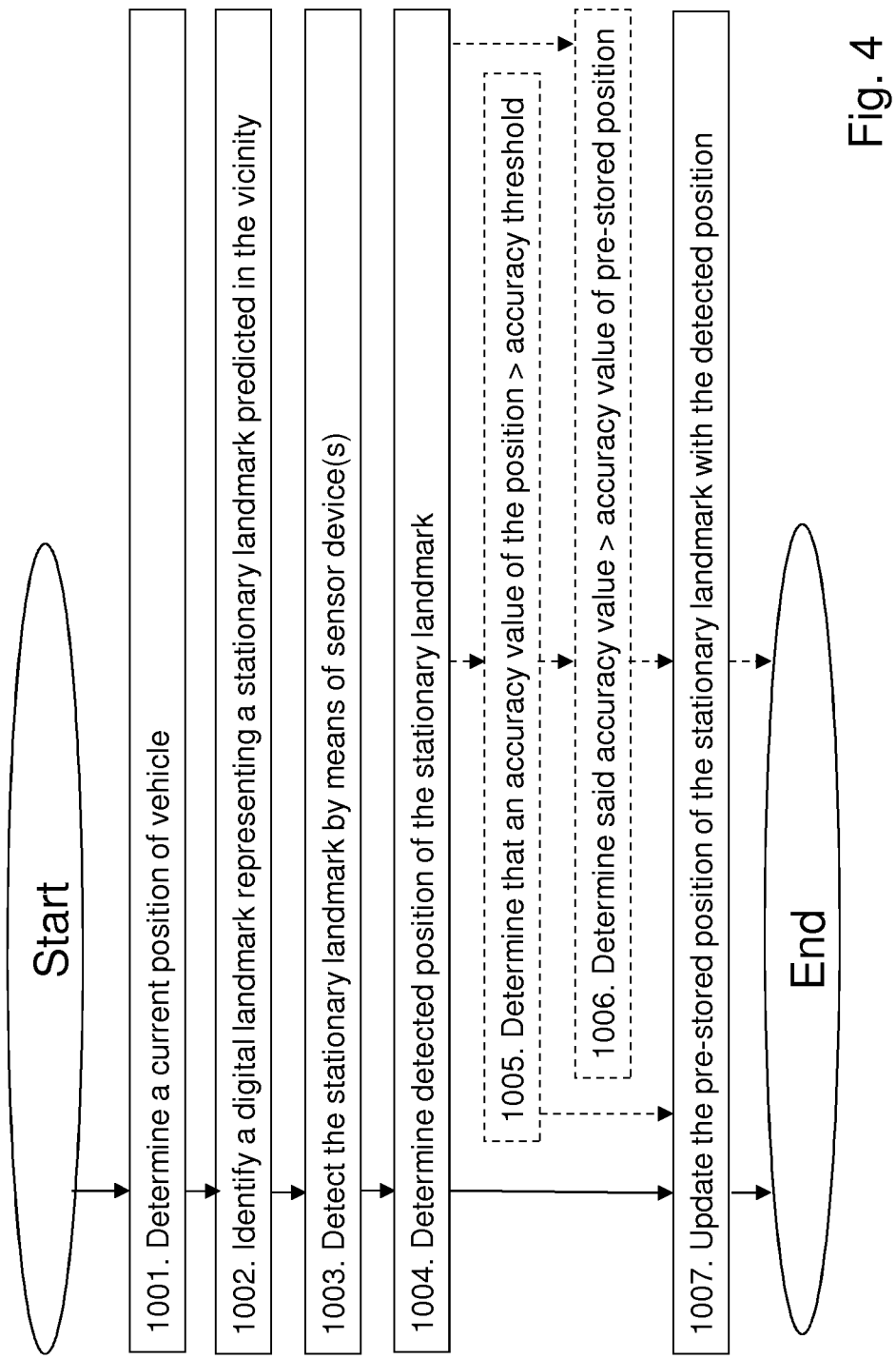
FIG. 4 is a flowchart depicting an exemplifying method performed by a digital map enhancement system according to embodiments of the disclosure.

FIG. 4 is a flowchart depicting an exemplifying method performed by a digital map enhancement system 1 according to embodiments of the disclosure. The method in the digital map enhancement system 1 is for improving accuracy of pre-stored digital map data 311 of a digital map 31 adapted to be utilized by a vehicle 2. The exemplifying method, which may be continuously repeated, comprises the following actions discussed with support from FIGS. 1-3. The actions may be taken in any suitable order, and/or one or more actions may even be performed simultaneously where applicable. For instance, Actions 1001-1004 may be performed essentially simultaneously, and/or to some extent in an alternative order.

Action 1001

In Action 1001, the digital map enhancement system 1 determines, e.g. by means of the vehicle position determining unit 101, the current position 21 of the vehicle 2. Correspondingly, the vehicle position determining unit 101 is adapted for determining the current position 21 of the vehicle 2.

Optionally, the current position 21 is determined based on input from the positioning system 6 on-board the vehicle 2. Correspondingly, the vehicle position determining unit 101 may further be adapted for determining the current position 21 based on input from the positioning system 6 on-board the vehicle 2.

Action 1002

In Action 1002, the digital map enhancement system 1 identifies in the pre-stored digital map data 311, e.g. by means of the mapped data identifying unit 102, a mapped digital landmark 3111 representing a stationary landmark 4 predicted to be in the vicinity of the current position 21 of the vehicle 2. Correspondingly, the mapped data identifying unit 102 is adapted for identifying in the pre-stored digital map data 311, a mapped digital landmark 3111 representing a stationary landmark 4 predicted to be in the vicinity of the current position 21 of the vehicle 2. The mapped digital landmark 3111 comprises the pre-stored position 31111 of the stationary landmark 4.

Optionally, the mapped digital landmark 3111 may be identified based on the Electronic Horizon technology, an equivalent thereof, and/or a successor thereof. Correspondingly, the mapped data identifying unit 102 may further be adapted for identifying the mapped digital landmark 3111 based on the Electronic Horizon technology, an equivalent thereof and/or a successor thereof.

Action 1003

In Action 1003, the digital map enhancement system 1 detects, e.g. by means of the landmark detecting unit 103, the stationary landmark 4 by means of the one or more sensor devices 5 on-board the vehicle 2. Correspondingly, the landmark detecting unit 103 is adapted for detecting the stationary landmark 4 by means of the one or more sensor devices 5 on-board the vehicle 2. The one or more sensor devices 5 are adapted for observing the surroundings of the vehicle 2.

Optionally, Action 1003 of detecting the stationary landmark 4 may comprise detecting the stationary landmark 4 by means of one or more of a vision sensor, radar sensor, and/or laser sensor. Correspondingly, the landmark detecting unit 103 may further be adapted for detecting the stationary landmark 4 by means of one or more of a vision sensor, radar sensor, and/or laser sensor.

Action 1004

In Action 1004, the digital map enhancement system 1 determines, e.g. by means of the landmark position determining unit 104, a detected position 41 of the stationary landmark 4 based on the current position 21 of the vehicle 2 and action 1003 of detecting the stationary landmark 4.

Correspondingly, the landmark position determining unit 104 is adapted for determining a detected position 41 of the stationary landmark 4 based on the current position 21 of the vehicle 2 and action 1003 of detecting the stationary landmark 4.

Action 1005

In optional Action 1005, the digital map enhancement system 1 may determine, e.g. by means of the position accuracy determining unit 106, that an accuracy confidence level value of the detected position 41 is greater than a predetermined accuracy threshold. Correspondingly, the position accuracy determining unit 106 may be adapted for determining that an accuracy confidence level value of the detected position 41 is greater than a predetermined accuracy threshold. The accuracy confidence level value may be based on a magnitude of a distance between the determined current position 21 of the vehicle 2 and the detected position 41 of the stationary landmark 4. Additionally or alternatively, the accuracy confidence level value may be based on type and/or types of the one or more sensor devices 5. Additionally or alternatively, the accuracy confidence level value may be based on number of one or more sensor devices 5. Additionally or alternatively, the accuracy confidence level value may be based on a value of at least one previous accuracy confidence level value.

Action 1006

In optional Action 1006, the digital map enhancement system 1 may determine, e.g. by means of the accuracy comparing unit 107, that the accuracy confidence level value of the detected position 41 is greater than the accuracy confidence level value of the pre-stored position 31111. Correspondingly, the accuracy comparing unit 107 may be adapted for determining that the accuracy confidence level value of the detected position 41 is greater than the accuracy confidence level value of the pre-stored position 31111.

In the embodiment of FIGS. 1 and 2, the accuracy confidence level value of the detected position 41 is exemplifying 92%, whereas the accuracy confidence level value of the pre-stored position 31111 is exemplifying 85%.

Action 1007

In Action 1007, the digital map enhancement system 1 updates, e.g. by means of the landmark position updating unit 105, the pre-stored position 31111 comprised in the mapped digital landmark 3111, with the detected position 41 of the stationary landmark 4, as shown in FIG. 2. Correspondingly, the landmark position updating unit 105 is adapted for updating the pre-stored position 31111 comprised in the mapped digital landmark 3111, with the detected position 41 of the stationary landmark 4.

Thereby, as shown in the foregoing, an approach has been introduced according to which a position 31111 of a stationary landmark 4 pre-stored in a corresponding mapped digital landmark 3111 of the map data 311, is replaced 1007 by a position 41 of said stationary landmark 4 determined 1006 based on detection 1003 of the stationary landmark 4 by one or more sensor devices 5 on-board the vehicle 2. Accordingly, the pre-stored position 31111 comprised in the digital landmark 3111 is replaced 1007 with a position value 41, which value 41 may be considered more precise than the old value 31111. That is, the pre-stored position 31111 of the stationary landmark 4 may, for one reason or another, be more or less incorrect. Thus, on subsequently determining 1004 a position 41 of the stationary landmark 4 based on detection 1003 of the stationary landmark 4 by the sensor device(s) 5, which detected position 41 may be determined to be more precise than the pre-stored position 31111, the detected position 41 may replace the pre-stored position 31111 comprised in the mapped digital landmark 3111, whereby more accurate road information is provided in the digital map 31. Moreover, by continuously and/or intermittently repeating the introduced method, the map data content 311 may successively become more precise.

The person skilled in the art realizes that the present disclosure by no means is limited to the embodiments described above. On the contrary, many modifications and variations are possible within the scope of the appended claims. It should furthermore be noted that the drawings not necessarily are to scale and the dimensions of certain features may have been exaggerated for the sake of clarity. Emphasis is instead placed upon illustrating the principle of the embodiments herein. Additionally, in the claims, the word "comprising" does not exclude other elements or steps, and the indefinite article "a" or "an" does not exclude a plurality.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method performed by a digital map enhancement system for improving accuracy of pre-stored digital map data of a digital map adapted to be utilized by a vehicle, the method comprising:
    determining a current position of the vehicle;
    identifying, in the pre-stored digital map data, a mapped digital landmark representing a stationary landmark predicted to be in a vicinity of the current position of the vehicle, the mapped digital landmark including a pre-stored position of the stationary landmark;
    detecting the stationary landmark by one or more sensor devices on-board the vehicle, the one or more sensor devices adapted for observing surroundings of the vehicle;
    determining a detected position of the stationary landmark based on the current position of the vehicle and the detecting of the stationary landmark;
    determining that an accuracy confidence level value of the detected position is greater than a predetermined accuracy threshold, wherein the accuracy confidence level value is based on one or a combination of a magnitude of a distance between the determined current position of the vehicle and the detected position of the stationary landmark, a type and/or types of the one or more sensor devices, a number of one or more sensor devices, and/or a value of at least one previous accuracy confidence level value; and
    updating the pre-stored position of the mapped digital landmark with the detected position of the stationary landmark.

2. The method according to claim 1 further comprising:
    determining that an accuracy confidence level value of the detected position is greater than an accuracy confidence level value of the pre-stored position.

3. The method according to claim 1 wherein detecting the stationary landmark by one or more sensor devices comprises detecting by one or more of a vision sensor, radar sensor, and/or laser sensor.

4. The method according to claim 1 wherein the determining the current position of the vehicle comprises determining the current position based on input from a positioning system on-board the vehicle.

5. The method according to claim 1 wherein the identifying the mapped digital landmark comprises identifying the mapped digital landmark based on the Electronic Horizon technology, an equivalent thereof, and/or a successor thereof.

6. A digital map enhancement system for improving accuracy of pre-stored digital map data of a digital map adapted to be utilized by a vehicle, the digital map enhancement system comprising:
- a vehicle position determining unit for determining a current position of the vehicle;
- a mapped data identifying unit for identifying, in the pre-stored digital map data, a mapped digital landmark representing a stationary landmark predicted to be in a vicinity of the current position of the vehicle, the mapped digital landmark including a pre-stored position of the stationary landmark;
- a landmark detecting unit for detecting the stationary landmark by one or more sensor devices on-board the vehicle, the one or more sensor devices adapted for observing surroundings of the vehicle;
- a landmark position determining unit for determining a detected position of the stationary landmark based on the current position of the vehicle and the detecting of the stationary landmark;
- a position accuracy determining unit for determining that an accuracy confidence level value of the detected position is greater than a predetermined accuracy threshold, wherein the accuracy confidence level value is based on one or a combination of a magnitude of a distance between the determined current position of the vehicle and the detected position of the stationary landmark, a type and/or types of the one or more sensor devices, a number of one or more sensor devices, and/or a value of at least one previous accuracy confidence level value; and
- a landmark position updating unit for updating the pre-stored position of the mapped digital landmark with the detected position of the stationary landmark.

7. The digital map enhancement system according to claim 6 further comprising an accuracy comparing unit for determining that an accuracy confidence level value of the detected position is greater than an accuracy confidence level value of the pre-stored position.

8. The digital map enhancement system according to claim 6 wherein the landmark detecting unit is adapted for detecting the stationary landmark by one or more of a vision sensor, radar sensor, and/or laser sensor.

9. The digital map enhancement system according to claim 6 wherein the vehicle position determining unit is adapted for determining the current position based on input from a positioning system on-board the vehicle.

10. The digital map enhancement system according to claim 6 wherein the mapped data identifying unit is adapted for identifying the mapped digital landmark based on the Electronic Horizon technology, an equivalent thereof and/or a successor thereof.

11. A vehicle comprising at least a portion of a digital map enhancement system according to claim 6.

12. A mobile device comprising at least a portion of a digital map enhancement system according to claim 6.

13. A non-transitory computer readable medium having stored computer executable instructions which, when executed by a digital map enhancement system for improving accuracy of pre-stored digital map data of a digital map adapted to be utilized by a vehicle, cause the system to:
- determine a current position of the vehicle;
- identify, in the pre-stored digital map data, a mapped digital landmark representing a stationary landmark predicted to be in a vicinity of the current position of the vehicle, the mapped digital landmark including a pre-stored position of the stationary landmark;
- detect the stationary landmark by one or more sensor devices on-board the vehicle, the one or more sensor devices adapted for observing surroundings of the vehicle;
- determine a detected position of the stationary landmark based on the current position of the vehicle and the detecting of the stationary landmark;
- determining that an accuracy confidence level value of the detected position is greater than a predetermined accuracy threshold, wherein the accuracy confidence level value is based on one or a combination of a magnitude of a distance between the determined current position of the vehicle and the detected position of the stationary landmark, a type and/or types of the one or more sensor devices, a number of one or more sensor devices, and/or a value of at least one previous accuracy confidence level value; and
- update the pre-stored position of the mapped digital landmark with the detected position of the stationary landmark.

* * * * *